(12) United States Patent
Chen (10) Patent No.: US 10,627,044 B2
(45) Date of Patent: Apr. 21, 2020

(54) CANE FOR PHOTOGRAPHING SUPPORT

(71) Applicant: Xiaoming Chen, Richmond Hill (CA)

(72) Inventor: Xiaoming Chen, Richmond Hill (CA)

( * ) Notice: Subject to any disclaimer, the term of this patent is extended or adjusted under 35 U.S.C. 154(b) by 0 days.

(21) Appl. No.: 16/198,373

(22) Filed: Nov. 21, 2018

(65) Prior Publication Data

US 2019/0186687 A1    Jun. 20, 2019

Related U.S. Application Data

(63) Continuation of application No. 15/957,334, filed on Apr. 19, 2018, now Pat. No. 10,371,317.

(30) Foreign Application Priority Data

Nov. 24, 2017  (CN) .................... 2017 2 1602283 U
Nov. 24, 2017  (CN) .................... 2017 2 1602343 U (51) Int. Cl.
| | | |
|---|---|---|
| F16M 13/02 | (2006.01) | |
| F16B 2/18 | (2006.01) | |
| F16M 11/04 | (2006.01) | |
| F16M 11/16 | (2006.01) | |
| F16M 11/28 | (2006.01) | |

(52) U.S. Cl.
CPC ............. *F16M 13/022* (2013.01); *F16B 2/18* (2013.01); *F16B 2/185* (2013.01); *F16M 11/041* (2013.01); *F16M 11/043* (2013.01); *F16M 11/16* (2013.01); *F16M 11/28* (2013.01); *F16M 2200/027* (2013.01)

(58) Field of Classification Search
CPC .. F16M 13/022; F16M 2200/027; F16B 2/185
USPC ............................ 248/221.11, 539, 511, 518
See application file for complete search history.

(56) References Cited

U.S. PATENT DOCUMENTS

| 4,437,753 | A  * | 3/1984 | Dunn ..................... | F16M 11/14 |
| --- | --- | --- | --- | --- |
| | | | | 248/169 |
| 4,570,887 | A  * | 2/1986 | Banister ............... | F16M 11/041 |
| | | | | 248/187.1 |
| 4,640,481 | A  * | 2/1987 | Kohno .................. | F16M 11/10 |
| | | | | 248/126 |
| 6,244,759 | B1 * | 6/2001 | Russo ................... | F16M 11/40 |
| | | | | 352/243 |
| 7,559,167 | B1 * | 7/2009 | Moody .................. | F41C 23/16 |
| | | | | 42/71.01 |
| 8,341,864 | B2 * | 1/2013 | Moody .................. | F16M 13/04 |
| | | | | 42/72 |
| 8,393,104 | B1 * | 3/2013 | Moody .................. | F41C 23/14 |
| | | | | 42/71.01 |
| 9,277,794 | B2 * | 3/2016 | Moreau .................. | A45B 9/00 |
| 2004/0217240 | A1 * | 11/2004 | Gordon ................ | F16M 11/041 |
| | | | | 248/176.1 |
| 2013/0233988 | A1 * | 9/2013 | Johnson ............... | G03B 17/561 |
| | | | | 248/229.14 |
| 2013/0287386 | A1 * | 10/2013 | Xu ........................ | F16M 11/041 |
| | | | | 396/428 |
| 2017/0261157 | A1 * | 9/2017 | Guo ..................... | F16M 11/123 |

\* cited by examiner

*Primary Examiner* — Muhammad Ijaz (57) ABSTRACT

A cane for photographing support, comprising: a grip; a supporting slide bar which is arranged in a mounting conduit inside the grip and can axially extend outward or retract inward; a locking switch which is used for operably locking or unlocking the supporting slide bar on the grip; and a locking guide rail arranged at an upper end of the supporting slide bar.

5 Claims, 12 Drawing Sheets

CANE FOR PHOTOGRAPHING SUPPORT

CROSS-REFERENCE TO RELATED APPLICATIONS

This application claims the benefit of CN Patent Application No. 201721602283.2 filed on Nov. 24, 2017, and claims the benefit of U.S. patent application Ser. No. 15/957,334 filed 19 Apr. 2018, the entire disclosures of which are hereby incorporated herein by reference.

TECHNICAL FIELD OF THE INVENTION

The present disclosure relates to a cane and in particular to a cane for photographing support.

BACKGROUND TECHNOLOGY OF THE INVENTION

A most common existing camera support is a camera tripod which is good in stability but huge and heavy in structure, thus is not suitable for instant shooting and mobile shooting and is inconvenient to use. Moreover, during the mobile shooting or fast shooting, the camera tripod is very likely to cause picture flutters, thus causing picture blurring and seriously affecting the definition and stability of the pictures.

With the improvement of people's living standards, outdoor trips are more and more popular, and mountaineering is one of the most popular events. Therefore, there is an urgent need for a novel cane which can be used both as a mountaineering cane and as a camera support when needed.

In addition, to overcome the defects in use of the tripod, the applicant has successfully developed a modular camera device through researches and tests. The modular camera device includes a shoulder rest assembly, an arm rest assembly and other modules. A photographer selectively matches, according to different shooting environments and usage requirements, the shoulder rest assembly with the arm rest assembly to form a camera support to replace the conventional camera tripod. Therefore, the mobile shooting and instant shooting can be well realized, and stable and clear shot pictures can be obtained.

However, when a heavy long lens is used or the photographer is a woman with poor physical strength, a support that can be used with the shoulder rest assembly to reduce the load of the photographer also becomes an urgent need for numerous photographers.

SUMMARY OF THE INVENTION

With respect to above issues, the present disclosure provides a cane which can be used as a mountaineering cane, separately connected to a quick release plate assembly to independently support a camera, connected to a main camera support to serve as a load support point and better satisfy the requirements for the shooting of a long lens, usage by female photographers and the shooting while mountaineering.

According to several aspects, the present disclosure provides a cane for photographing support, including: a grip; a supporting slide bar which is arranged in a mounting conduit inside the grip and can axially extend outward or retract inward; a locking switch which is used for operably locking or unlocking the supporting slide bar on the grip; and a locking guide rail arranged at an upper end of the supporting slide bar.

The present disclosure has the following beneficial effects. In the cane for photographing support provided by the present disclosure, by providing, on the grip, a locking guide rail connected to the connecting device or by directly providing the locking device on the grip, the grip can act as an ordinary mountaineering cane during mountaineering and can also be connected to a quick release plate assembly of the camera by the locking device when there is a photographing need, so that the camera is mounted on the cane and the function of the cane as a camera support for independently supporting the camera is realized. Thus, a user does not need to carry other support structures such as a cumbersome tripod, so that the load of the user is relieved and a great convenience is brought to the user. When a heavy long lens is used or the photographer is a woman with poor physical strength, the user will feel very hard to support the entire camera device. In this case, the cane may be quickly connected to the main camera support by the locking device, and the cane acts as a camera support to support the camera device, so that the user does not bear the camera device and may focus more on framing and composition, and the shooting quality may be effectively ensured. The cane of the present disclosure expands the modularity of the camera device. By matching the cane with the locking device, the user can selectively assemble or disassemble the cane freely according to different shooting environments and usage requirements, so that the requirements for DIY of the user are better satisfied. The cane of the present disclosure is further characterized by simple and compact structure, convenient assembly and disassembly, low cost and the like.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Further advantages and configurations are explained in more detail in the following text on the basis of preferred exemplary embodiments of the invention, and in conjunction with the accompanying drawings, in which.

DETAILED DESCRIPTION OF THE INVENTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
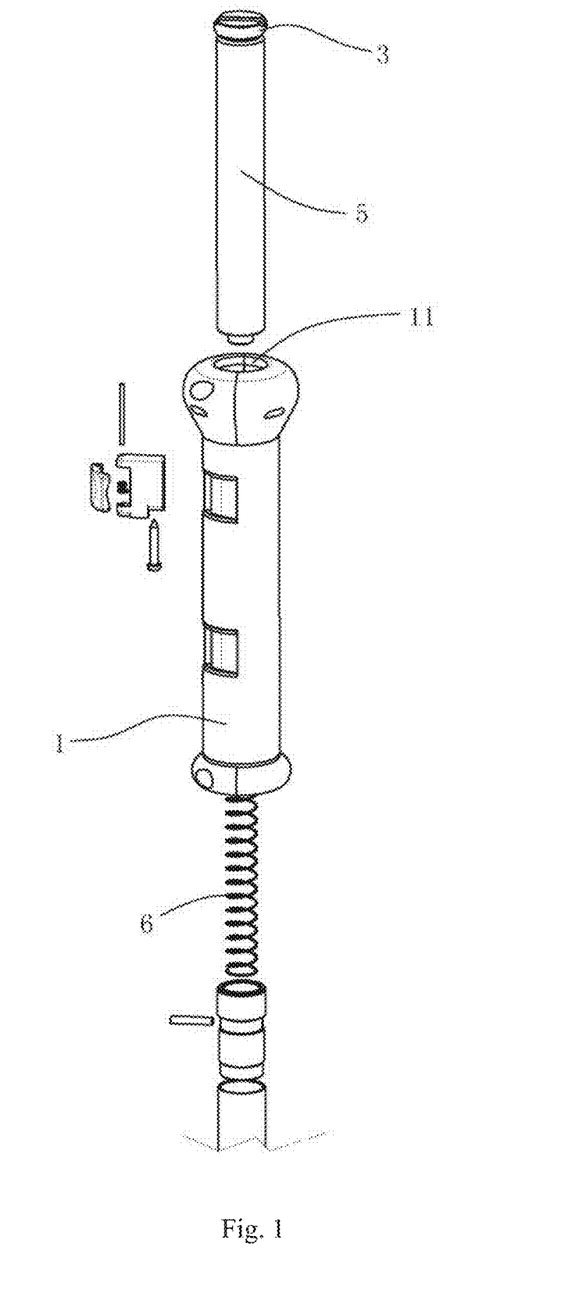
FIG. 1 is an exploded schematic structural view of the cane according to the present disclosure.
Figure 2:
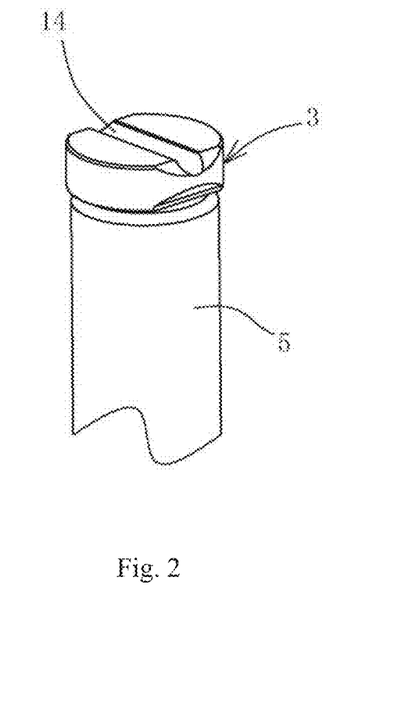
FIG. 2 is a schematic view of a local structure of the cane according to the present disclosure.
Figure 3:
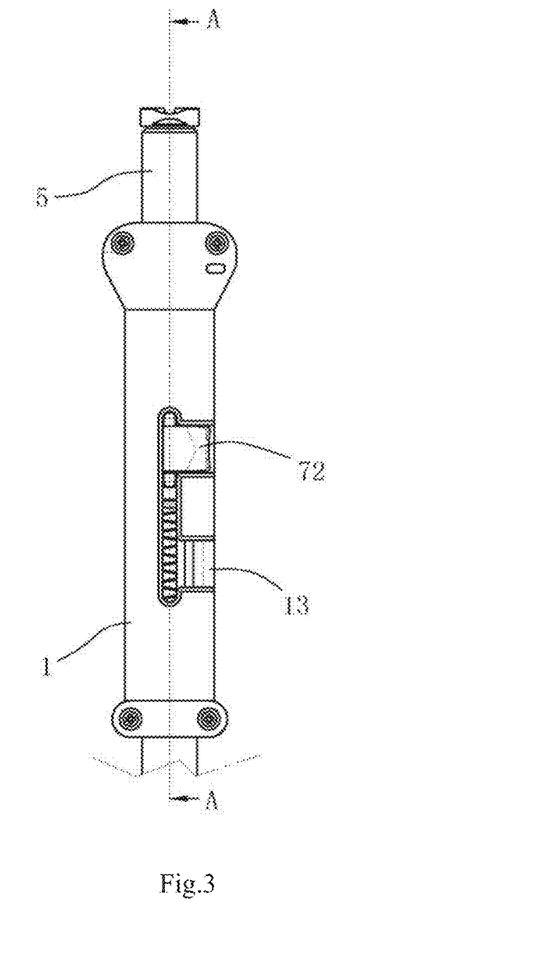
FIG. 3 is a partially structural schematic view of an assembled structure of the cane according to the present disclosure.
Figure 4:
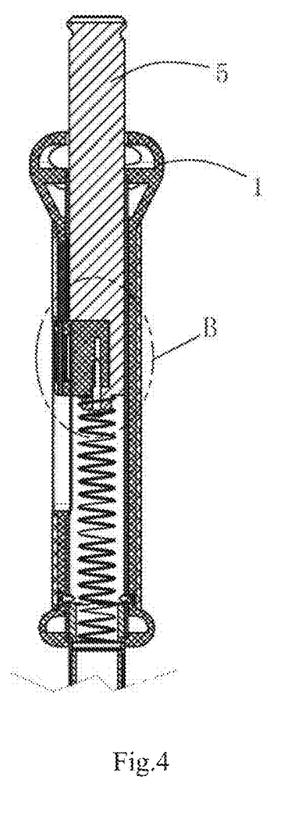
FIG. 4 is a sectional view of the cross-section A-A in FIG. 3.
Figure 5:
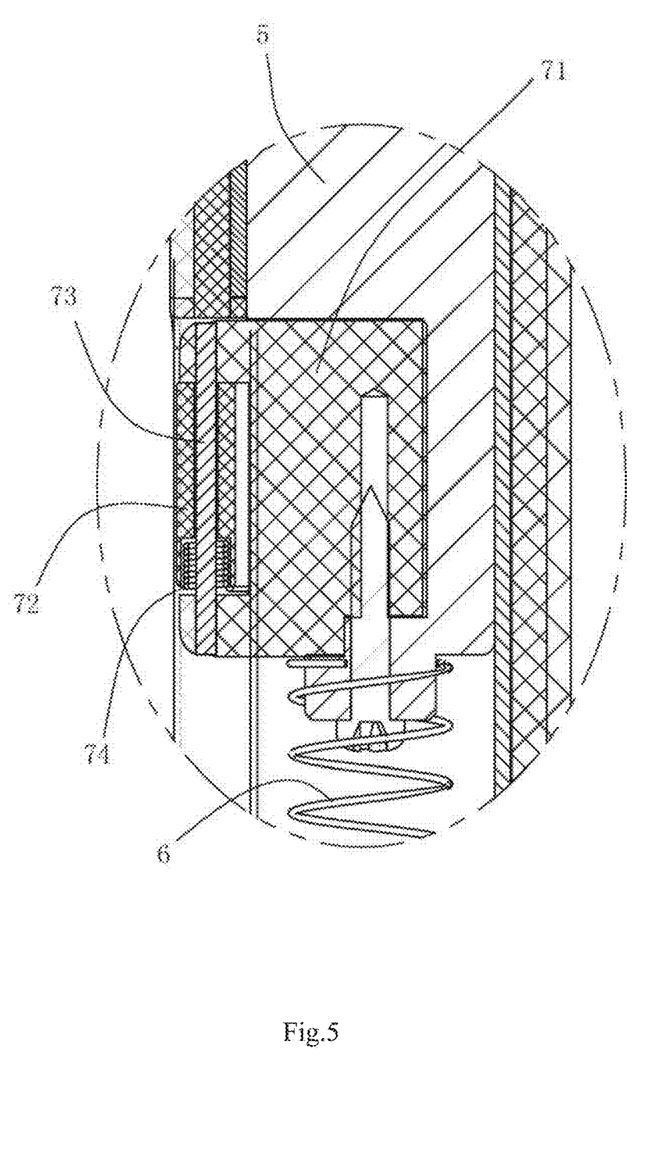
FIG. 5 is a partially enlarged view of part B in FIG. 4.
Figure 6:
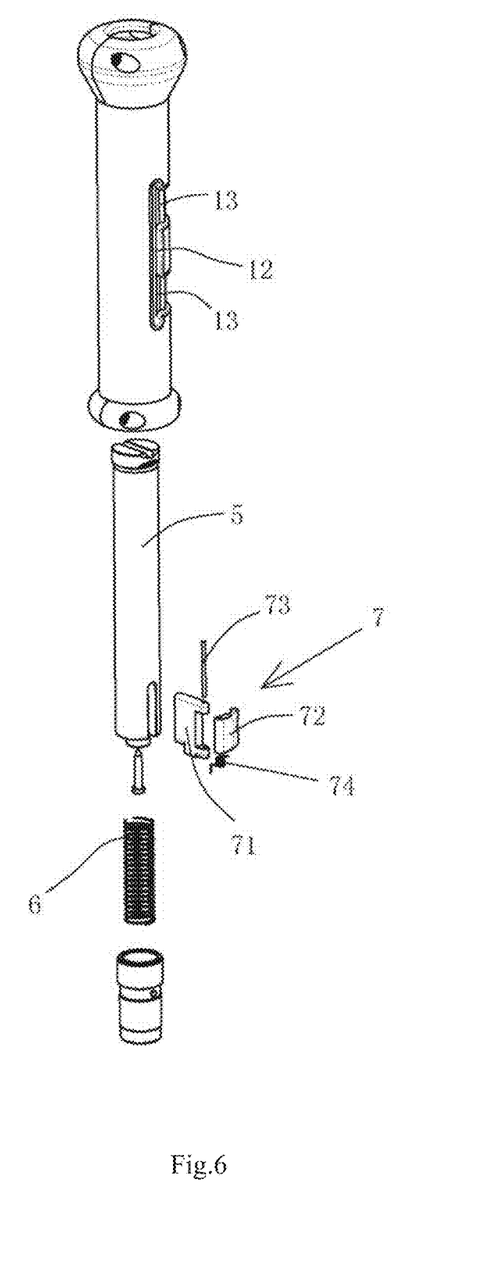
FIG. 6 is an exploded view of the assembly of a supporting slide bar and a grip according to the present disclosure.

With reference to FIGS. 1-12, the present disclosure provides a cane for photographing support, including a grip 1. A locking guide rail 3 connected to a mechanical assembly 2 is provided on the grip 1, or a mechanical assembly 2 is provided on an upper portion of the grip 1. The grip 1 may be connected to a quick release plate assembly of a camera by the mechanical assembly 2, or connected to a main camera support 4. The present invention provides two kinds of canes. For one kind of canes, a locking guide rail 3 is provided in an upper portion of the cane, the cane is connected to a mechanical assembly 2 by the locking guide rail 3, and the mechanical assembly 2 is bucked with a quick release plate assembly of a camera or with a main camera support 4, as shown in FIG. 2, the locking guide rail 3 can be directly formed on the upper end of the supporting slide bar, that is, the locking guide rail 3 can be integrally formed on the upper end of the supporting slide bar. Optionally, the mechanical assembly 2 can be integrated at an end of the cane or fixed at an end of the crane by welding, screws or in other connection ways, and the crane is then buckled with quick release plate assembly of the camera or the main camera support 4 by the mechanical assembly 2. In some embodiment, the mechanical assembly 2 is a locking device, for example, the quick locking device disclosed in U.S. patent application Ser. No. 15/957,334, which is incorporated herein by reference in its entirety.

Specifically, with reference to FIGS. 3-6, in some embodiments of the present disclosure, a mounting conduit 11 is provided inside the grip 1, and a supporting slide bar 5 is slidingly fitted with the mounting conduit 11 and can axially extend outward from or retract in the mounting conduit 11. Specifically, the locking guide rail 3 may be provided at an upper end of the supporting slide bar 5 of the grip 1. When the cane needs to be connected to the quick release assembly of the camera or the main camera support 4, the supporting slide bar 5 may be extended outward from the mounting conduit 11. When the cane is only used as a cane, the supporting slide bar 5 is retracted (i.e., hidden) in the mounting conduit 11. Therefore, the support slide 5 has two change states, i.e., being extended outward when the connection is needed and being retracted when the connection is not needed, so that no more space is occupied and it is convenient and practical.

In order to assist the supporting slide bar 5 to extend outward from the mounting conduit 11, in some embodiments, an elastic member 6 for pushing the supporting slide bar 5 to extend outward is provided within the mounting conduit 11. The elastic member 6 is preferably a compression spring. One end of the elastic member 6 is sheathed on the supporting slide bar 5, while the other end thereof is internally provided in the bottom of the grip 1. A connecting sleeve 16 and a C-type elastic pin 15 may be provided on the bottom of the grip 1, and the C-shaped elastic pin 15 passes through the connecting sleeve 16 so that the lower end of the compression spring 6 may be fixed on the bottom of the grip 1 by the C-shaped elastic pin 15, wherein the C-shaped elastic pin 15 is a hollow pin, and the cylindrical outer wall of the C-shaped elastic pin 15 has a groove in the longitudinal direction to elastically change the diameter thereof when being pressed. The cane further includes a locking switch 7 used for operably extending, positioning and locking the supporting slide bar 5 on the grip 1. That is, when the supporting slide bar 5 is extended outward from the mounting conduit 11 and connected to the quick release plate assembly of the camera or the main camera support 4, the supporting slide bar 5 may be positioned and locked by the locking switch 7 in order to prevent the supporting slide bar 5 from retracting under stress. When the supporting slide bar 5 is hidden in the mounting conduit 11 in a retracted state, the supporting slide bar 5 is positioned and locked on the grip 1 by the locking switch 7, in order to prevent the supporting slide bar 5 from extending outward automatically due to the elastic member 6 when the cane is used as a mountaineering cane.

Figure 7:
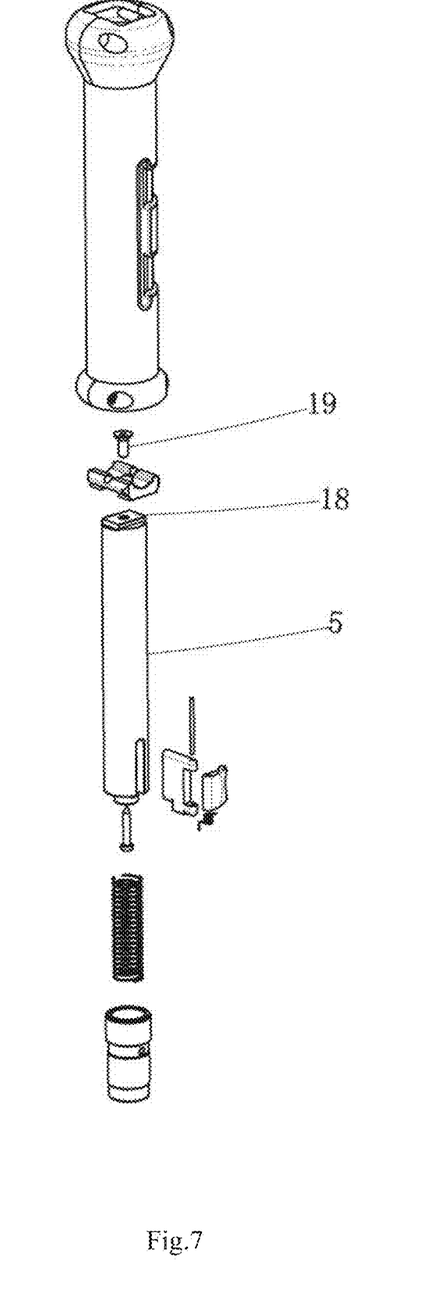
FIG. 7 is an exploded view of the assembly of a supporting slide bar and a grip according to an embodiment of the present disclosure.
Figure 8:
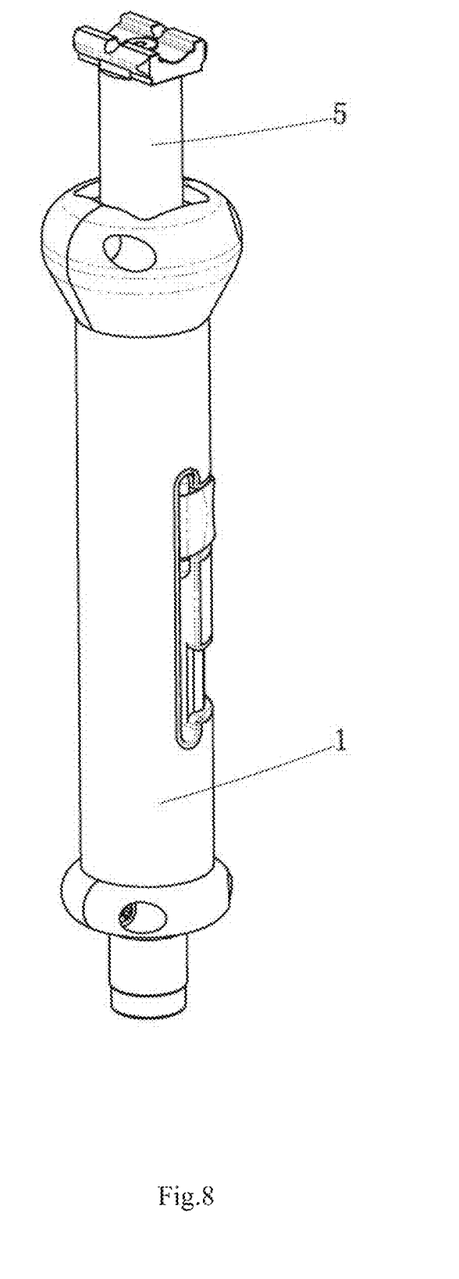
FIG. 8 is a partially structural schematic view of an assembled structure of the cane shown in FIG. 7 according to the present disclosure.
Figure 9:
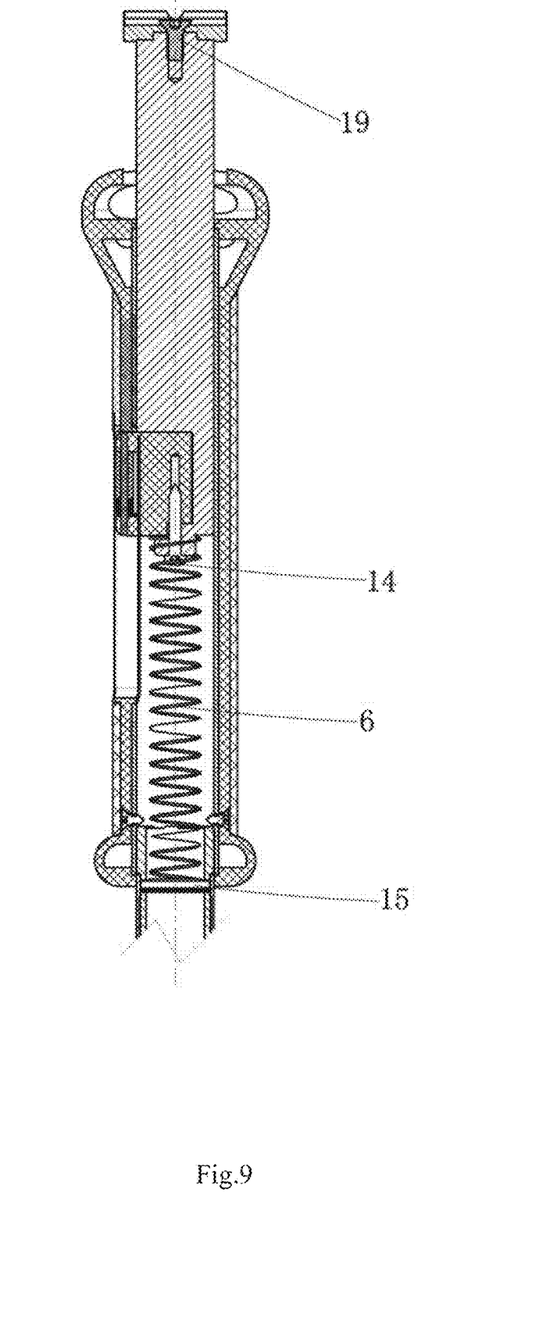
FIG. 9 is a schematic cross-sectional view of the cane of FIG. 8.
Figure 10:
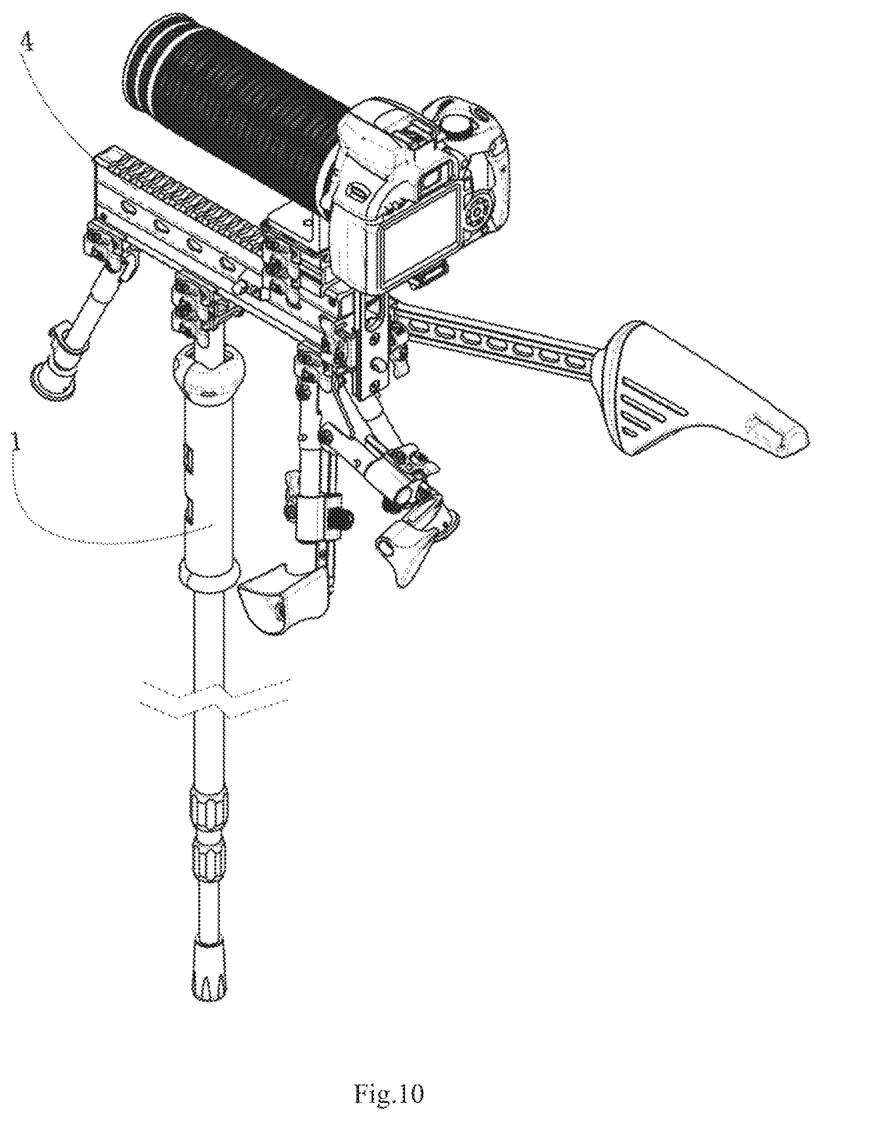
FIG. 10 is a schematic structural view when the cane of FIG. 7 is connected to a main camera support.

Advantageously, in order to increase a locking and guiding length on the locking guide rail 3, and to further improve the stability after locking, as shown in FIG. 7, a lug boss 18 is disposed at the upper end of the supporting slide bar 5, such as a square lug boss, the lug boss 18 is provided with a mounting hole, and the locking guide rail 3 is fastened to the upper end of the supporting slide bar 5 by a locking screw 19. Therefore, the locking guide rail 3, as a separate and independent element, can be designed to a certain dimension or size according to practical use, for example, the locking guide rail 3 can be designed, such as a rectangular piece, with a dimension greater than a cross-section of the supporting slide bar 5, such that the length of the guide rail is sufficient to provide an improved stability after locking. As comparison, if the supporting slide bar 5 has a machined cylindrical shape, and if the locking guide rail 3 is directly formed on the top end of the supporting slide bar 5, the radial dimension of the locking guide rail 3 will be no greater than that of the supporting slide bar 5, such that the guide rail length will be limited to the radial dimension of the supporting slide bar 5.

The locking switch 7 may be provided on the grip 1 or on the supporting slide bar 5. In this embodiment, the locking switch 7 is provided on the supporting slide bar 5. A straight chute 12 for enabling a linear movement of the locking switch 7 along the straight chute 12 is provided on the grip 1, wherein the linear movement can be a up-and-down movement as shown. The straight chute 12 functions to evade the locking switch 7 when the locking switch 7 moves up and down along with the supporting slide bar 5, so that the locking switch 7 is extended outward from the grip 1 and may be used for realizing the up-and-down movement of the supporting slide bar 11. Upper and lower positioning lock catch sites 13 are further provided on an outer side of the grip 1 corresponding to the straight chute 12. The locking switch 7 and the two positioning lock catch sites 13 realize the locking of the supporting slide bar 5 in a extended or retracted state. Specifically, in this embodiment, the positioning lock catch sites 13 are grooves provided on the outer wall of the straight chute 12, and the rotary switch 72 is of a sheet structure fitted with the grooves. Therefore, the structure is simple and compact, it is convenient for locking, and the locking is reliable and durable.

In some embodiments, for easier operation, the locking switch 7 is a rotary locking switch and includes a fixed seat 71 fixed on the supporting slide bar 5 and a rotary switch 72 hinged to the fixed seat 71. An installation groove 17 for accommodating the fixed seat 71 is provided on a side of the supporting slide bar 5 close to one end of the locking switch. After the fixed seat 71 is accommodated in the installation groove 17, a tapping screw 14 passes through one end of the supporting slide bar 5 and the fixed seat 71, so that the fixed seat 71 is fixed on the supporting slide bar 5 by the tapping screw 14. The rotary switch 72 can rotate about the fixed seat 71 to engage with or disengage from the positioning lock catch sites 13. When in use, the rotary switch 72 is separated from the lower positioning lock catch site 13, due to the compression spring, the supporting slide bar 5 will move up, so that the supporting slide bar 5 is extended outward from the mounting conduit 11; and, when the rotary switch 72 reaches the upper positioning lock catch site 13, the rotary switch 72 is fastened in the positioning lock catch site 13 to realize locking. In this case, by fitting the locking switch 72 with the positioning lock catch site 13, the supporting slide bar 5 is locked, so that the supporting slide bar 5 will not move down under the effect of the gravity of the quick release assembly of the camera or the main camera support 4.

To enable the rotary switch 72 to automatically restore to the positioning lock catch site 13 for realizing automatic locking, in this embodiment, the rotary switch 72 is hinged to the fixed seat 71 by a pin shaft 73. Specifically, a torsional spring 74 having two ends being separately resisted against the rotary switch 72 and the fixed seat 71 is sheathed on the pin shaft 73. When the supporting slide bar 5 is moved in place, the rotary switch 72 is released, and the rotary switch 72 is automatically fastened in the positioning lock catch site 13 due to the resilience force of the torsional spring 74 so as to realize automatic locking, so that the supporting slide bar 5 is prevented from extending outward or retracting under stress when the user forgets fastening the rotary switch 72 in the positioning lock catch site 13.

In some embodiments, the locking guide rail 3 is preferably a Picatinny rail or a trapezoidal rail.

The mechanical assembly may include upper and lower pairs of fixed compression grooves and moving compression grooves. One pair of the fixed compression groove and the moving compression groove is connected to the locking guide rail 2, and the other pair of the fixed compression groove and the moving compression groove is connected to the quick release plate assembly or the main camera support. When the mechanical assembly is fixedly mounted on the grip 1 by integral molding, welding, and threads or in other ways, only one pair of fixed compression groove and moving compression groove may be reserved.

The cane of the present invention has the following three usages.

Firstly, the cane may be used as an ordinary mountaineering cane.

Figure 11:
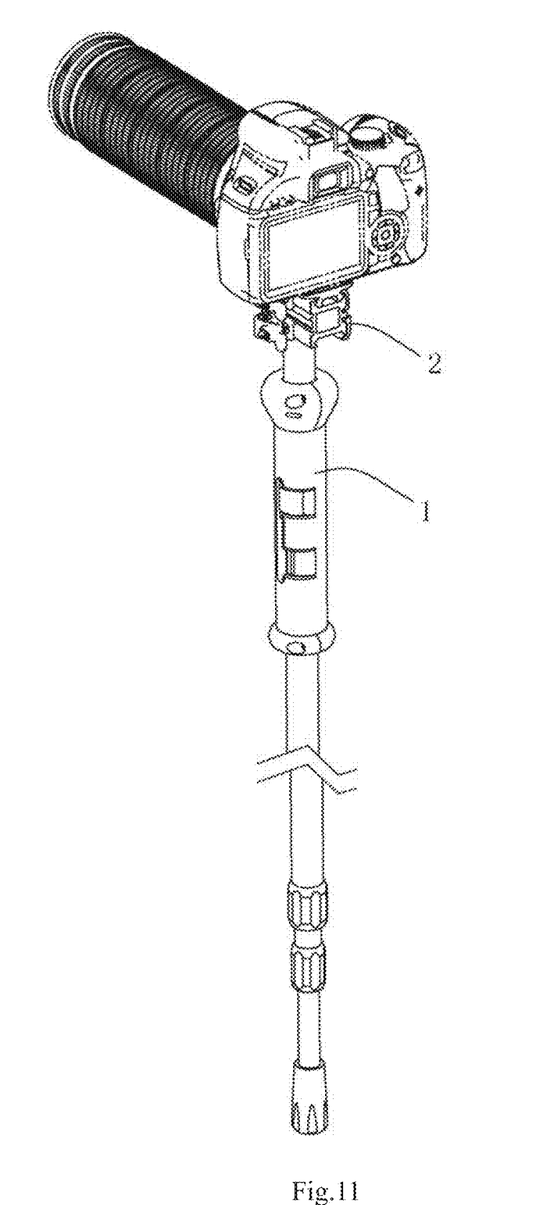
FIG. 11 is a schematic structural view when the cane of the present disclosure is independently used as a camera support to support a camera.

Secondly, specifically, with reference to FIG. 11, the cane is connected to a quick release plate assembly of a camera by the mechanical assembly, so that the camera can be mounted on the cane, and the function of the cane as a camera support for independently supporting the camera is realized. Thus, a user does not need to carry other support structures such as a cumbersome tripod, so that the load of the user is relieved and a great convenience is brought to the user.

Figure 12:
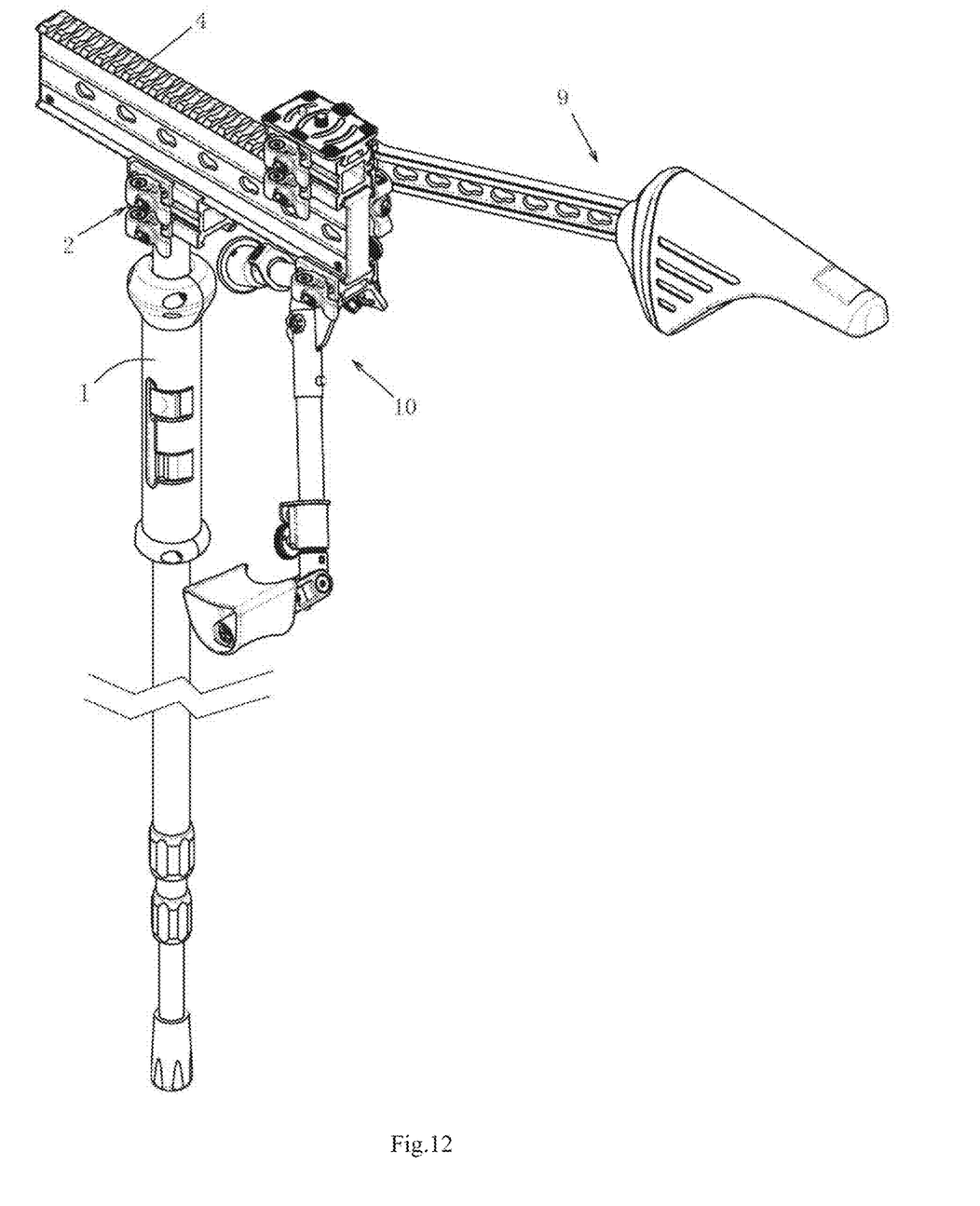
FIG. 12 is a schematic structural view when the cane of the present disclosure is connected to a main camera support.

Thirdly, specifically, with reference to FIG. 12, when a heavy long lens is used or the photographer is a woman with poor physical strength, the user will feel very hard to support the entire camera device. In this case, the cane may be quickly connected to the main camera support 4 by the mechanical assembly. Specifically, the cane is supported on the ground, an arm rest assembly 10 is resisted against the elbow joint, and a shoulder rest assembly 9 is resisted against the shoulder, so that the cane, the arm rest assembly 10 and the shoulder rest assembly 9 support and limit the camera device. Accordingly, the load of the photographer is effectively reduced, the fatigue of the photographer is relieved, the user may does not bear the camera device and may more focus on finding view and composition, and the shooting quality may be effectively ensured. The entire camera device is supported at three points by the cane, the shoulder rest assembly 9 and the arm rest assembly 10, so the more stable supporting is realized, it is less likely to result in flutters during shooting, and the stability of the camera during shooting is improved. The cane of the present disclosure expands the modularity of the camera device. By matching the cane with the mechanical assembly, the user can selectively assemble or disassemble the cane freely according to different shooting environments and usage requirements, so that the requirements for DIY of the user are better satisfied.

Advantageously, a straight positioning chute fitted with a pull rod of a mechanical assembly can be provided on a top end face of the grip.

The cane of the present disclosure is characterized by simple and compact structure, convenient assembly and disassembly, low cost and the like.

Numerical data have been presented herein in a range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. While examples have been described in detail, those familiar with the art to which this disclosure relates will recognize various alternative designs and examples for practicing the disclosed method within the scope of the appended claims.

While the invention has been described in connection with one or more embodiments, it should be understood that the invention is not limited to those embodiments. On the contrary, the invention covers all alternatives, modifications and equivalents as may be included within the scope of the appended claims.

What is claimed is:

1. A cane for photographing support, comprising:
   a grip;
   a supporting slide bar arranged in a mounting conduit inside the grip and can axially extend outward or retract inward;
   a locking switch used for operably locking or unlocking the supporting slide bar on the grip; and
   a locking guide rail arranged at an upper end of the supporting slide bar;
   wherein the locking switch is used for operably positioning and locking the supporting slide bar in different extended states on the grip, and
   wherein the locking switch is arranged on the supporting slide bar; a straight chute for enabling a linear movement of the locking switch along the straight chute is provided on the grip; and, at least one positioning lock catch site fitted with the locking switch is further provided on an outer side of the grip corresponding to the straight chute, to lock the extended or retracted state of the supporting slide bar.

2. The cane for photographing support according to claim 1, wherein the locking switch is a rotary locking switch and comprises a fixed seat fixed on the supporting slide bar and the rotary switch is hinged to the fixed seat, and the rotary switch can rotate about the fixed seat to engage with or disengage from the at least one positioning lock catch site.

3. The cane for photographing support according to claim 1, wherein the at least one positioning lock catch site is a groove disposed on an outer sidewall of the grip and adjacent to the straight chute, and the locking switch is a rotary switch comprise of a sheet structure fitted with the groove.

4. The cane for photographing support according to claim 1, wherein the locking switch is a rotary switch hinged to a fixed seat by a pin shaft, and a torsional spring having two ends separately resisted against the rotary switch and the fixed seat is sheathed on the pin shaft.

5. The cane for photographing support according to claim 1, wherein the locking guide rail is a Picatinny rail or a trapezoidal rail.

\* \* \* \* \*